N. Leonard,
Bee-Hive.
No. 106,377. Patented Aug. 16, 1870.
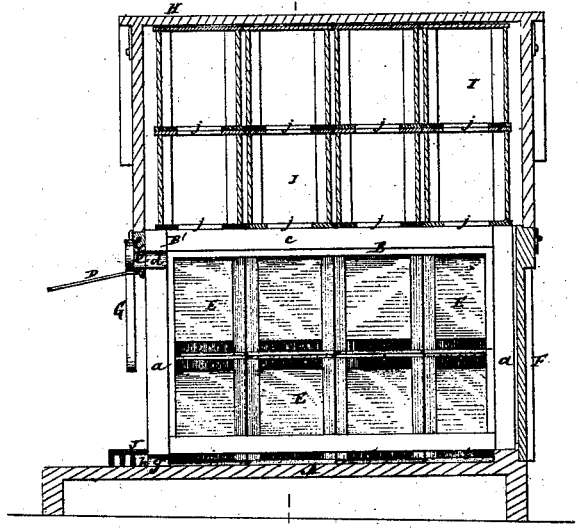
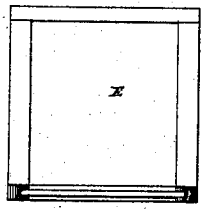
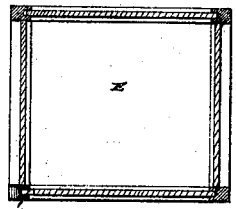
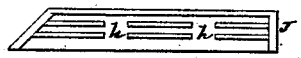
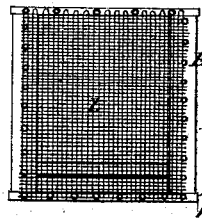
Witnesses:
N. Leonard
per Brown, Coombs &c.
Attorneys

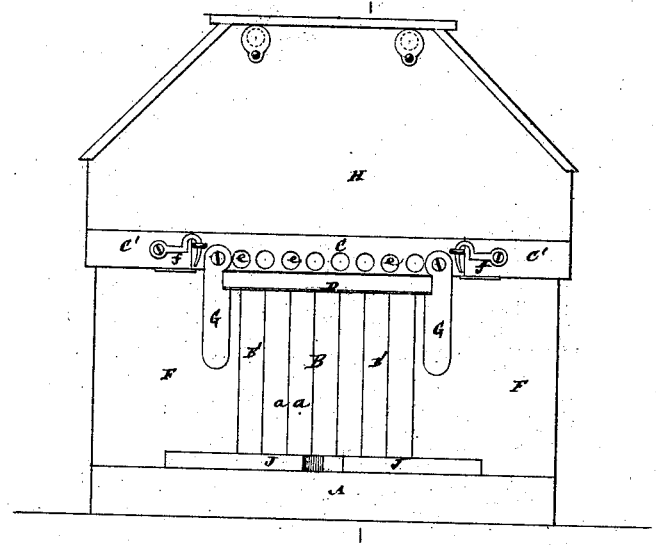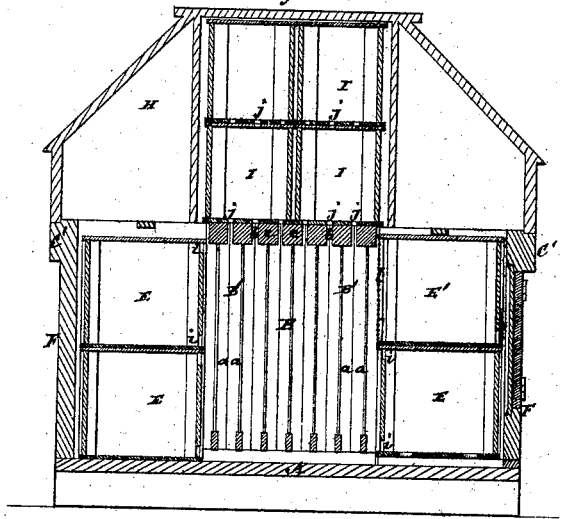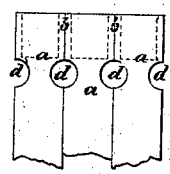

United States Patent Office.

VOLNEY LEONARD, OF SPRINGFIELD, PENNSYLVANIA.

Letters Patent No. 106,377, dated August 16, 1870.

IMPROVEMENT IN BEE-HIVES.

The Schedule referred to in these Letters Patent and making part of the same.

*To all whom it may concern:*

Be it known that I, VOLNEY LEONARD, of Springfield, in the county of Bradford and State of Pennsylvania, have invented a new and useful Improvement in Bee-Hives, of which the following is a full, clear, and exact description, reference being had to the accompanying drawing forming part of this specification, and in which—

Figure 1 represents a front elevation of my improved bee-hive, with the lighting-board as extended and locked;

Figure 2, a vertical section, taken as indicated by the line *x x* in

Figure 3, which is a vertical section at right angles to fig. 2, and taken as denoted by the line *y y* in figs. 1 and 2;

Figure 4 is an end view, on a large scale, of certain independent sections (in part) used in constructing the comb-frame;

Figure 5 is an outside view, and

Figure 6, a transverse section of one form of honey-box used in the hive;

Figure 7, a face view of another form of box suitable for the wintering of queens; and Figure 8, an under or face view of a worm-trap used in connection with the hive.

Similar letters of reference indicate corresponding parts.

In the bee-hive which is the subject of this invention, the comb-frame is preferably made up of a series of loose independent frames, with holes in their ends, for entry of the bees, so shaped and arranged that said independent frames or frame-sections may be promiscuously placed, in putting them together, to make up the entire frame, that, in being composed of independent sections, facilitates the extraction of the honey. Likewise, the lighting-board is made movable by hinging it to a ledge-section that is in hooked attachment with the remainder of the ledge, and said lighting-board held extended by pivoted arms, that, when the lighting-board is shut down, serve as doors to close the entrances to the comb-frame. This portion resembles that shown and described in my patent granted June 4, 1867, except as regards the detachable ledge-section to which the lighting-board is hinged. The honey-boxes are loose and inclosed; also held in place by movable sides to the hive, which are in hooked connection with the outside ledge.

To enable others skilled in such matters to make and use the invention, I will now proceed to describe it with reference to the accompanying drawing.

A is the base-board of the hive, and

B, the comb-frame that is arranged loosely thereon.

This frame may be made whole, or in one piece, but it is preferred to construct it of independent frames or frame-sections, B' B', arranged to lie parallel to each other, and lengthwise of the hive, with their end strips, *a a*, in contact, leaving suitable outlets, *b b*, for the bees, between their upper horizontal stringers, *c c*, and the front end strips *a*, which are provided, on either side, near their tops, with semicircular openings, *d d*, that form entrances for the bees in continuation of the outside holes, *e e*, in the ledge-section C of the hive over the lighting-board D. The several frame-sections B' are of similar construction, so that, in putting them together, they may be promiscuously placed with the semicircular apertures *d d* of each pair always in position to form continuations of the openings *e e*. Thus, making the comb-frame in sections facilitates taking out of the honey without injury to the bees.

Said loose comb-frame or frame-sections and the honey-boxes E, on opposite sides of the same, are held in place, and said boxes inclosed by loose box-like sides, F F, meeting at the back of the hive, where they may be secured by a hook or other fastening, and meeting the comb-frame in front, where they are secured by hooks, *f f*, arranged to catch into staples on the ledge-section C of the general ledge C'.

The ledge-section C is made detachable, to facilitate access to the frame-sections, or sliding out of the latter, and has hinged to it the lighting-board D, which, when extended, is held by notched arms, G G, pivoted to the ledge-section C. These arms may be swung to one side, to allow the lighting-board to drop, and afterwards be turned up into a horizontal position, to form doors for closing the entry-apertures, *e e*, in the ledge-section.

H is the cap of the hive, said cap fitting onto the top of the sides F F, and inclosing upper tiers of honey-boxes, I I, arranged over the comb-frame.

Holes, *g*, are made at the bottom of the comb-frame or end strips, comprising the same in front, for entry of the bees, and for worms to pass out of the hive into internally-grooved or ribbed traps, J J, arranged to lie at the base of the comb-frame in front of it, and provided with openings or spaces, *h*, for passage of the worms into grooves in the trap or traps that are loose, to facilitate being cleaned or emptied.

The honey-boxes may be variously constructed. Thus, they may be made wholly of glass, in wooden frames, or with certain of their sides of wood and others of glass, the lower or side tiers of boxes E having openings in front, of which there may be two, *i i*, one above and one below, communicating with the interior of the comb-frame, while the upper tiers of boxes I have openings, *j j*, in their bottoms, communicating with the top openings in the comb-frame, and connecting the lower ones of such tiers with the upper ones thereof. A convenient style of structure is shown in figs. 5 and 6, in which the box E, made wholly of glass with wooden frame, has one of its angle-pieces removed, as at $k$, to establish the necessary opening for the bees when working, which opening may be closed, when required to use the box for transportation and sale with the honey in it, by simply closing said opening with an angle-piece to fit  Or, again, the boxes may, if desired, be made with the holes in their bottoms, and rest on suitable strips to secure passage for the bees.

E', in figs. 2 and 7, represents a box suitable for the wintering of queens, the same being made with a wire-gauze face, $l$, arranged to front the one open side of the comb-frame B, which construction provides for passage of warmth from the swarm.

What is here claimed, and desired to be secured by Letters Patent, is—

1. The comb-frame B, made up of loose parallel frame-sections B', provided with holes, $d\ d$, in their sides, at or near their tops, and holes, $g$, at their bottoms, as specified.

2. The detachable ledge-section C, carrying the hinged lighting-board D and the pivoted arms G, arranged for operation essentially as described.

3. The combination of the movable sides F with the honey-boxes E and comb-frame B, substantially as specified.

V. LEONARD.

Witnesses:
    J. L. PHILLIPS,
    O. P. HARKNESS,
    J. K. PHILLIPS.